Aug. 19, 1969     H. DONATH     3,461,713
PLIERS WITH ZIPPER-REFORMING JAWS
Filed Oct. 13, 1967
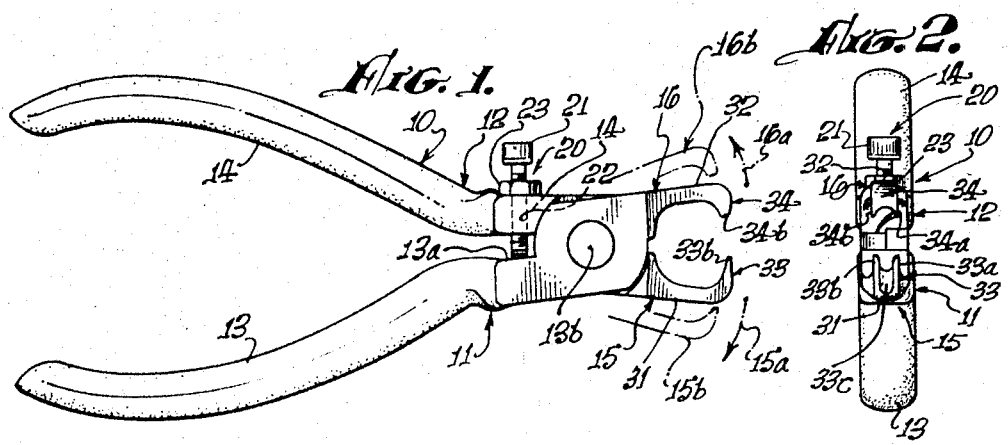
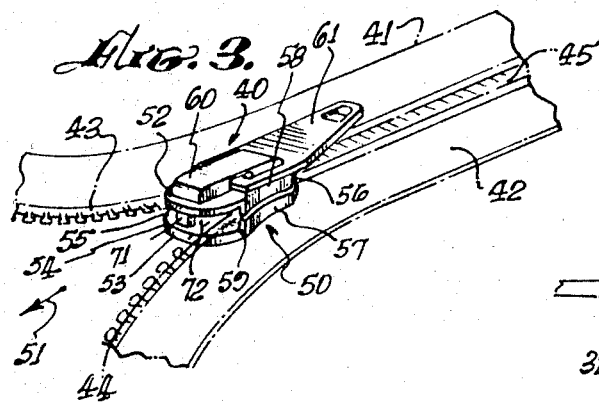
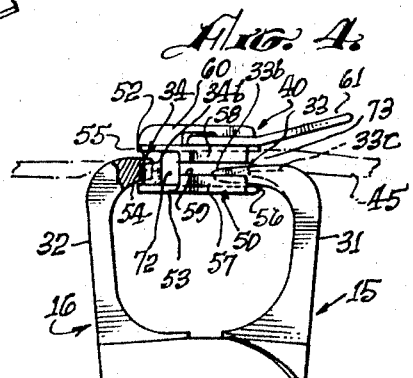
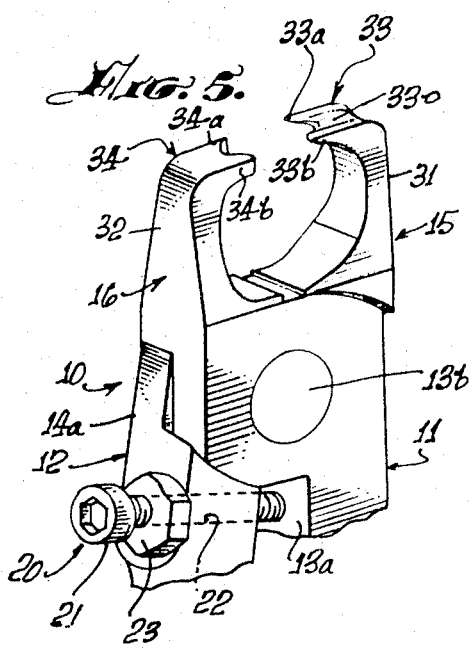
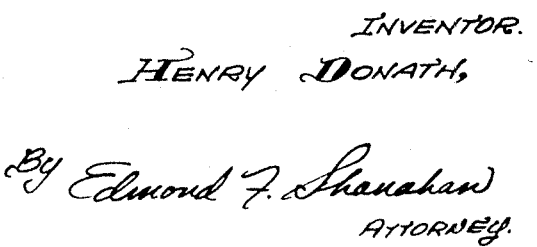
INVENTOR.
HENRY DONATH,
By Edmond F. Shanahan
ATTORNEY.

United States Patent Office 3,461,713
Patented Aug. 19, 1969

3,461,713
PLIERS WITH ZIPPER-REFORMING JAWS
Henry Donath, 4342 Laurel Grove Ave.,
North Hollywood, Calif. 91604
Filed Oct. 13, 1967, Ser. No. 675,128
Int. Cl. B21d 9/08, 37/12; B25b 7/00
U.S. Cl. 72—409                    3 Claims

ABSTRACT OF THE DISCLOSURE

A pliers for restoring or freeing a deformed or jammed slide in a slide fastener of the zipper-type, in which the two jaws curve inwardly toward each other, each jaw being of a forked design different from the other and shaped respectively to fit precisely into the double entrance passages and the single exit passage of a zipper slide which is partly filled with a pair of tooth-bearing zipper tapes, said pliers being provided an adjustable gap stop for precisely matching the jaw gap to the length of the slide being repaired.

---

This invention relates generally to tools for repairing in place a slide fastener of the zipper type; more particularly, it relates to a pliers provided with unique forked reforming jaws in combination with an adjustable gap stop means to enable an unskilled person to make a quick repair of the zipper slide without removing the zipper or the slide from the garment, bag, or other item in which it is installed to effectuate closure.

Throughout this specification, and also in the claims, both the prior art and the invention will be discussed in terms of a slide fastener, and for purposes of illustration, a slide fastener in a small, inconspicuous size used on a woman's garment, such as skirt. The slide fastener to which reference is made is identified in English and most other languages as a "zipper" (Webster's Third New International Dictionary, and Seventh New Collegiate Dictionary). Also, the invention applies to such slide fasteners wherever they are used, for example, for closure of leather suitcases, boat covers and tents, etc.; but the following discussion is limited to the slide fasteners as used on garments only for purposes of illustration, and not as a restriction on the utility of the invention.

The pliers of the present invention is a repair tool for repairing a jammed or malfunctioning slide fastener in place, that is, installed in the opening in which it is to be used, without removing it for repair or replacement. The pliers may also prove useful to manufacturers of slide fasteners which are found to be defective at the end of the manufacturing process. The invention will find its greatest utility, however, in repairing zippers in place, since the value of the zipper is very small, relative to the value of the garment or other item of which it is a part, and it is the salvaging of the entire item, or the great saving over the time and expense involved in cutting away the defective zipper and replacing it with a new one.

Department stores, and the garment manufacturers who supply them, are resigned to return by customers of a substantial number of garments because of a jammed slide fastener. The manufacturer may use the best quality of materials, and the utmost care in manufacture, and the department store may be most conscientious in dealing with its customers; but despite all their efforts, the returns by dissatisfied customers continue to occur. Sometimes, the costs of repairing the item is prohibitive, and it must be replaced or the money refunded.

Also, slide fasteners which function perfectly for some time after the garment was purchased, suddenly develop a propensity to jam; for example, children's garments are often discarded long before they are worn out, simply because of a jammed slide fastener.

The typical construction of the slide fastener must be understood in order to understand the most common cause of jamming and malfunctioning, and also to understand the objects, advantages, and method of operation of the present invention. The slide fastener for which the pliers of the invention is designed consists of two rows of teeth, usually made of metal or plastic, which are attached (usually by sewing) to adjacent edges of two strips of tape, which are adapted to be attached to each side of the opening to be closed (usually by sewing). The two rows of teeth are spaced along the edges of their respective tapes, and formed with mating protrusions and recesses, so that they can be interlocked with one another, one after the other in sequence, to close the opening between two parts of a garment, for example, upon which the respective tapes are mounted.

A specially constructed slide is used for the operation of bringing the teeth into interlocking closure. The slide may be conveniently described in terms of operating to close the slide fastener; but it will be understood that the same slide may be pulled in reverse to open the zipper, and discussion of the opening process is omitted because it is well known and description would appear to be superfluous. The slide, as it is moved manually in the closing direction, receives the two separated rows of teeth into two openings in its leading end. The sidewalls of the slide are longitudinally slotted so that the two rows of teeth can move into two entrance passages in the leading part of the slide, with the tapes passing along side slots. Inside of the slide, the two rows of teeth are progressively interlocked, and a single row of interlocked teeth passes out of the trailing end of the slide through a single exit passage.

Sliding fastener slides, although varying in certain details not relevant to the present invention, may be described generally as having inner and outer plates, disposed on opposite sides of the slide fastener tapes and in planes parallel to the plane of the tapes, and a longitudinal center wall joining said plates. Generally, only the trailing part of the slide has any side walls, and these side walls do not provide any support between the plates, since each side wall is slit throughout its length to accommodate the passage of the tape. Usually, the construction of the slide is completed with some kind of a handle, grip, tab, or the like, usually of the folding type, so as to lie flat on the surface of a garment or the like. Also, the reference to inner and outer plates of the slide is merely the adoption of the terms commonly used with reference to a garment. The inner slide, on the inner side of the garment, does not have the slide handle; the plate which bears the handle may be referred to as the outer plate, and on garments will be on the outer surface of the garment.

The great majority of instances of malfunctioning of zippers is traceable to a deformed or displaced slide. The slide fastener can continue to operate fairly well if some of the interlocking teeth are missing, or damaged. The slide can produce interlocking closure by virtue of proper interlocking between adjacent teeth, one after another; and the slide is usually sufficiently heavy to force into closure slightly deformed teeth.

Unfortunately, the slide is vulnerable to deformation since the inner and outer plates are connected to one another only by the longitudinal center wall, and their side edges are overhanging and unsupported. Even if these plates are not damaged by the user, they are very likely to be damaged by cleaning and pressing, and sometimes even by folding during packing. The damage to the slide is usually in deformation of the plate edges so that they approach each other too closely, particularly at the adjacent edges of the slotted side walls, so that the tapes, and their interlocking teeth cannot pass through the passages within the slide. In the rare instances in which the slide does not function because the plates have been separated too much, it is a simple matter to tap them on their outer surfaces until they have been deformed toward closure; this closure will usually be too much but can be corrected to spacing required for precise operation by the use of the pliers of the present invention.

The tools available at the present time for repairing jammed, deformed, or malfunctioning slide fasteners are either elaborate devices used by manufacturers, and not suitable for repair of the zipper in place, or not suitable for use at the location of retail sale, by an unskilled sales person. Ordinary hand tools do not offer any precision, in a type of repair in which very close precision is required in order to restore the slide fastener to smooth operation.

It is the major object of the present invention to provide a simple pliers, low in cost, and requiring almost no skill on the part of the user, which will, in a single moment of use, restore the slide fastener by reforming it precisely to the dimensions of its manufacturing specifications.

The second important object of the invention is to provide a pliers, as described, which may be used with slide fasteners of several different sizes, provided they fall within a certain range of size, by making a single simple adjustment in the pliers of the invention.

The foregoing and other objects of the invention, and its many advantages, are achieved by means of dies on the jaws of the pliers which are utterly unlike each other, and which are unlike the dies used in the manufacture of the slide, since they are intended to be used with the slide fastener in place, and with the two tapes and their interlocking teeth present within the passages of the slide.

The invention will best be understood from the following description of one preferred specific embodiment, which should be read in connection with the accompanying drawings in which:

FIGURE 1 is a side elevational view of a pliers constructed according to the invention;

FIGURE 2 is a right-side view of the pliers of FIGURE 1, showing the outer ends of the jaws of the pliers of the invention;

FIGURE 3 is a perspective view of a typical slide fastener for which the pliers of the invention is employed as a repair tool;

FIGURE 4 is an enlarged side elevational view of the pliers of FIGURES 1 and 2, showing the pliers as applied to the slide of the slide fastener of FIGURE 3; and FIGURE 5 is an enlarged, fragmentary, perspective view, of the pivotal parts and jaws of the pliers of FIGURES 1, 2 and 4.

In FIGURE 1, the pliers of the invention is indicated generally by the numeral 10 and is seen to be comprised primarily of a pair of levers 11 and 12, which are pivotally connected to one another by means of a pivotal connection shaft 13, in any manner standard with pliers, such as by bolt, rivet, or the like, and including any bearing construction desired. The pliers 10 may be described typically as having its two lever members 11 and 12, which cross over each other at the pivotal connection 13, as comprised of handles 13 and 14 extending to the left of pivotal connections 13 as viewed in FIGURE 1, and jaws 15 and 16 at the right thereof. As illustrated in FIGURE 1, the handles 13 and 14 have been brought as close together as permitted by the presence of an adjustable stop, identified generally by the numeral 20, and comprised of a fitted fastener or bolt 21, which passes through an internally threaded bore 22 in handle 14, and bears on the opposite surface 13a of handle 13. A nut 23 is provided merely to permit tightening against the outer surface 14a of handle 14 so that the bolt 21, once adjusted to the desired closure spacing, may be tightly locked into position.

The jaws 15 and 16 are seen in FIGURES 1 and 2 as they appear when closed to a predetermined minimum gap set by the position of the stop 20. When the jaws 15 and 16 are swung open in the direction of the arrows 15a and 16a, they assume positions indicated by the dashed outlines 15b and 16b.

The jaws 15 and 16 extend outwardly along jaw extensions 31 and 32, terminating at their outward ends in inwardly turned, facing, and opposed die members 33 and 34.

It is important to note that the radial or swinging distance between the axis of pivotal connection 13 and die members 33 and 34 is preferably sufficiently great, as provided by the length of jaw extensions 31 and 32, so that the dies 33 and 34 function, in reforming a slide as described hereinafter, as if they were approaching the leading and trailing ends of the slide substantially on a straight longitudinal line. Too short a radius for jaw extensions 31 and 32 not only leave inadequate room for accommodating a slide from the handle side, but also, may produce too sharp a radius of curvature of movement so that undesirable deformation of the slide may be introduced by the repair pliers 10 itself. FIGURES 2 and 5 show in further detail that dies 33 and 34 are utterly unlike each other, although both have inwardly facing forked ends. The construction and operation of jaws 33 and 34 must be understood in terms of the typical construction of the slide of a slide fastener 40, illustrated in FIGURE 3, and comprised of right and left tapes, 41 and 42, respectively, which bear right and left interlocking teeth 43 and 44, spaced along their length at their inner adjacent edges so as to make an interlocking closure indicated at 45. Slide 50 moves in the direction of the arrow 51 to produce closure, and is viewed in FIGURE 3 from the exterior of the garment on which it is mounted, so that one may refer to the top structure of slide 50 as an outer plate 52 and bottom as inner plate 53.

Outer plate 52 and inner plate 53 are connected to each other only by a longitudinal center wall 54, which extends along the center line of the slide 50 from its leading end 55 to about half way, or even less, toward the trailing end 56 of the slide 50. Although this center wall 54 is relatively thick and massive at its leading end, it must diminish in lateral thickness toward its trailing edge, inside of slide 50, so as to provide passages which achieve the tooth interlocking operation.

On each side of the slide 50, there are side walls, in the middle or trailing part of slide 50, but these side walls are comprised of two separate parts, as seen at lower left side wall 57, and upper left side wall 58, which are separated along their entire length by a longitudinal side slot 59 which accommodates passage of left tape 42 during the relative movement of slide 50.

On the upper surface of plate 52, a longitudinal center ridge 60 is provided for the accommodation of a folding handle or pull tab 61.

It will be seen that the construction illustrated in FIGURE 3, and described in connection therewith, and further illustrated in FIGURE 4, accomplishes the closure operation by the passage of the two tapes 42 and 41 through internal passages in the slide 50. Tapes 41 and 42 enter slide 50 through two entrance passages 71 and 72 and leave at the trailing end 56 by one exit passage 73. It is important to note that the tapes 41 and 42 may be pulled away from the openings of entrance passages 71 and 72 so that reforming can be done directly on the outer and inner plates 52 and 53, respectively, but exit passage 73 must be reformed while it is partially filled with the interlocked teeth 45 and parts of the adjacent tape edges 41 and 42. For this reason, the dies 33 and 34 are uniquely shaped and very different from each other, and particularly in the case of die 33, are different from those dies used during manufacture of the slide 50. As seen in FIGURE 4, die 33 must bring its forked portion to bear in the exit passage, through contact with the adjacent closed teeth 45.

The pliers 10 may be applied for purposes of repair, as illustrated in FIGURE 4, from the inner side of the garment, so as to avoid any damage to the face of the garment and also to avoid any interference with the pull tab 61. Also, it should be noted, that it is inner plate 53 which is most likely to be deformed, since it is less massive than outer plate 52.

It will be seen from FIGURE 5 that leading in die 34 is relatively massive, and has two backwardly projecting projections 34a and 34b which serve to reform and re-space to precise specifications the vertical opening of entrance passages 71 and 72 between the leading edges of outer and inner plates 52 and 53.

Die 33 is also provided with two projections 33a and 33b which project forwardly with respect to slide 50, but are provided, not for the accommodation of the longitudinal center wall 54, as in the case of projections 34a and 34b, but in order to accommodate the presence of the interlocked line of teeth 45. Also, it will be noted that die 33 is deeply slotted at 33c, likewise for the purpose of bringing pressure to bear on the interlocked teeth 45 without damaging them. It will be noted that pliers 10 generally, and particularly the construction of the dies 33 and 34 make it possible to bring reforming pressure between outer and inner plates 52 and 53, respectively, without damaging the right and left interlocking teeth 43 and 44, or the row of interlocked teeth 45.

It will be seen from the foregoing that I have provided a pliers utterly unlike any pliers heretofore known, and utterly unlike any tool used for the manufacture or repair of slide fasteners.

While I have described one specific embodiment, and noted several preferred features found therein, it is not my intention to be restricted to the precise details illustrated and described. On the contrary, it is my intention to claim within the scope of my invention all modifications, improvements, or alterations which fall within the scope of the appended claims.

I claim:

1. A pliers for reforming in place the slide of a slide fastener for the type which accomplishes closure of an opening by means of two rows of teeth spaced along tapes on each side of said opening, and moveable into interlocking relationship by means of a slide accommodated between said tapes, said slide having slotted side walls to receive the tooth-bearing edges of said tapes, and said slide having between inner and outer plates a longitudinal center wall providing a pair of entrance passages converging to a single exit passage, which pliers includes:

first and second pivoted levers, each having a jaw and a handle extending from opposite sides of a pivotal connection;
an adjustable stop on one of said handles to limit to a preselected spacing the minimum gap to which said jaws may be closed;
first and second forming dies on the respective jaws of said first and second levers; said dies facing inwardly toward each other and in substantial opposing alignment with each other when said pliers is closed to said minimum gap;
a pair of entrance passage projections on said first forming die, said projections being adapted to be closely received in said entrance passages of said slide on each side of the leading end of said center wall and adapted to force open said inner and outer plates to restore operative spacing therebetween; and
a pair of exit passage projections on the second of said dies adapted to be closely received into said exit passage with one of said projections closely accommodated on each side of a row of interlocked teeth emerging from said slide, and the outer ends of said projections being received between said tapes and one of said plates in the region of said slotted side walls, and adapted to force open the slots of said side walls to operative spacing when said pliers is applied to said slide and closed to said minimum gap.

2. A pliers as described in claim 1, in which said jaws are radially extended from said pivotal connection to produce an arc of movement of said first and second dies toward each other, which arc is selected to be sufficiently flat to produce effectively longitudinal pressure, as said dies close toward said minimum gap, on any slide in a range of sizes for which said stop is adapted to be adjustable.

3. A pliers as described in claim 1, in which said stop is a threaded bolt received in a threaded bore in one of said handles adjacent to said pivotal connection, and passing through said bore with its end bearing against the adjacent surface of the other of said handles, and said bolt is provided with a nut for tightening against said bore opening when said bolt has been positioned to provide a desired minimum gap.

References Cited

UNITED STATES PATENTS 2,489,842    11/1949    Wochner.
2,624,114    1/1953    Althausen _____ 30—271

ROBERT C. RIORDON, Primary Examiner

R. V. PARKER, JR., Assistant Examiner

U.S. Cl. X.R.

81—5.1